US008045561B1

(12) United States Patent
Varma et al.

(10) Patent No.: US 8,045,561 B1
(45) Date of Patent: Oct. 25, 2011

(54) TWO STAGE TRAFFIC SCHEDULING

(75) Inventors: Subir Varma, Ashburn, VA (US); Mehdi Alasti, Rockville, MD (US)

(73) Assignee: Clear Wireless LLC, Kirkland, WA (US)

( * ) Notice: Subject to any disclaimer, the term of this patent is extended or adjusted under 35 U.S.C. 154(b) by 641 days.

(21) Appl. No.: 12/112,713

(22) Filed: Apr. 30, 2008

(51) Int. Cl.
*H04L 12/28* (2006.01)
*G01R 31/08* (2006.01)

(52) U.S. Cl. .................. 370/395.4; 370/230.1; 370/235; 370/412

(58) Field of Classification Search ....... 370/229–230.1, 370/235, 328, 392, 394, 395.21, 395.4–395.43, 370/412–443; 709/229, 233
See application file for complete search history.

(56) References Cited

U.S. PATENT DOCUMENTS

| | | | |
|---|---|---|---|
| 6,775,231 B1 * | 8/2004 | Baker et al. ................. | 370/230.1 |
| 6,975,638 B1 * | 12/2005 | Chen et al. ................... | 370/412 |
| 7,027,414 B2 * | 4/2006 | Walsh et al. .................. | 370/316 |
| 7,151,776 B1 * | 12/2006 | Iyer et al. ..................... | 370/401 |
| 7,283,468 B1 * | 10/2007 | Hill et al. ..................... | 370/229 |
| 2003/0119556 A1 * | 6/2003 | Khan et al. ................... | 455/560 |
| 2004/0013089 A1 * | 1/2004 | Taneja et al. ................. | 370/235 |
| 2005/0175014 A1 * | 8/2005 | Patrick ......................... | 370/395.43 |
| 2006/0242319 A1 * | 10/2006 | Sang et al. ................... | 709/240 |
| 2007/0104130 A1 * | 5/2007 | Venkatachalam ............ | 370/329 |
| 2007/0147341 A1 * | 6/2007 | Izumikawa et al. .......... | 370/351 |
| 2007/0153803 A1 * | 7/2007 | Lakshmanamurthy et al. ......................... | 370/395.43 |
| 2007/0287467 A1 | 12/2007 | Oswal et al. | |
| 2008/0002592 A1 | 1/2008 | Yegani et al. | |
| 2008/0188231 A1 * | 8/2008 | Zhu et al. ..................... | 455/450 |

OTHER PUBLICATIONS

Eric Andrews, "Migrating to Flatter, All-IP Wireless Networks," Converge! Network Digest, Jan. 16, 2008, 7 pages, http://www.convergedigest.com/bp/bp1.asp?Id=502&ctgy=Mesh.
Jasleen Sahni, et al., "Scheduling CBR Flows: FIFO or Per-flow Queuing?," 15 pages, University of Texas at Austin and Ensim Corporation, Austin Texas, Mountain View, California, http://www.nossday.org/1999/papers/37-1992261996.pdf.
Dr. Ehab S. Al-Shaer, "Multimedia Networking TDC 573," Lecture # 5-a: Differentiated Services (DiffServ), pp. 1-28, School of Computer Science & Telecommunications, DePaul University, Chicago, Illinois, http://www.mnlab.cs.depaul.edu/~ehab/Courses/TDC573/PDF/5-diffserv.pdf.

(Continued)

*Primary Examiner* — Aung S Moe
*Assistant Examiner* — Redentor Pasia
(74) *Attorney, Agent, or Firm* — O'Brien Jones, PLLC

(57) ABSTRACT

A first traffic flow directed to a first wireless device is received. A second traffic flow directed to a second wireless device is received. These traffic flows comprise at least a first service flow classification and a second service flow classification. The first traffic flow and the second traffic flow are scheduled based on the first service flow classification and the second flow classification. This produces first and second device scheduled flows. The first and second device scheduled flows are classified into a plurality of flow classes. The plurality of flow classes comprises at least a first flow class and a second flow class. The first scheduled flow and the second scheduled flow are scheduled based on the first flow class and the second flow class. This produces an aggregate traffic flow.

6 Claims, 6 Drawing Sheets

OTHER PUBLICATIONS

Kathleen Nichols, et al., "Definition of the Differentiated Services Field (DS Field) in the IPv4 and IPv6 Headers," Dec. 1998, pp. 1-20, Cisco Systems, Torrent Networking Technologies, and EMC Corporation, http://tools.ietf.org/html/rfc2474.

Steven Blake, et al., "An Architecture for Differential Services," Dec. 1998, pp. 1-36, Torrent Networking Technologies, EMC Corporation, Sun Microsystems, Nortel UK, Bell Labs Lucent Technologies, and Lucent Technologies, http://tools.ietf.org/html/rfc2475.

Juha Heinanen, et al., "Assured Forwarding PHB Group," Jun. 1999, pp. 1-11, Telia Finland, Cisco Systems, Lucent Technologies, and MIT LCS, http://tools.ietf.org/html/rfc2597.

Bruce Davie, et al., "An Expedited Forwarding PHB (Per-hop Behavior)," Mar. 2002, pp. 1-16, Cisco Systems, Motorola, Tellabs, EPFL, TRW, PMC—Sierra, Nortel Networks, and Lucent Technologies, http://tools.ietf.org/html/rfc3246.

* cited by examiner

TWO STAGE TRAFFIC SCHEDULING

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known a long term evolution (LTE). Additional standards such as the fourth generation communication system (4G) are also being pursued. All of these standards pursue the aim of providing a comprehensive IP solution where voice, data and streamed multimedia can be given to users on an "anytime, anywhere" basis. These standards also aim to provide higher data rates than previous generations. All of these standards may include specifications for various aspects of wireless communication with a network including processes for registering on the network, carrier modulation, frequency bands of operation, and message formats.

Overview

A method of managing network traffic is disclosed. A first traffic flow directed to a first wireless device is received. A second traffic flow directed to a second wireless device is received. These traffic flows comprise at least a first service flow classification and a second service flow classification. The first traffic flow is scheduled based on the first service flow classification and the second flow classification. This produces a first device scheduled flow. The second traffic flow is schedule based on the first service flow classification and the second flow classification. This produces a second device scheduled flow.

The first device scheduled flow and the second device scheduled flow are classified into a plurality of flow classes. The plurality of flow classes comprise at least a first flow class and a second flow class. The first scheduled flow and the second scheduled flow are scheduled based on the first flow class and the second flow class. This produces an aggregate traffic flow.

A method of scheduling backhaul traffic to a plurality of wireless devices is disclosed. A first packet and a second packet that are directed to a first wireless device are received. The first packet is of a first traffic class. The second packet is of a second traffic class. The first packet is placed into a first queue based on the first traffic class. The second packet is placed into a second queue based on the second traffic class. The first packet is removed from the first queue and the second packet is removed from the second queue in an order that is based on at least the first traffic class, the second traffic class, and an amount of space left in at least the first queue.

The first packet is classified into a first flow classification. The second packet is classified into a second flow classification. The first packet is placed into a first flow class queue based on the first flow classification. The second packet is placed into a second flow class queue based on the second flow classification. The first packet and the second packet are sent to a backhaul link in an order that is based on at least the first flow class, the second flow class, and an amount of space left in the first flow queue.

A method of scheduling backhaul traffic directed to a plurality of wireless devices is disclosed. An incoming traffic flow comprising a first device flow and a second device flow is received. The incoming traffic flow is separated into the first device flow and the second device flow. The first device flow is separated into a first service first device flow, and a second service first device flow. The second device flow is separated into a first service second device flow, and a second service second device flow. A first service first device flow packet is sent to a first per-hop behavior queue. A second service first device flow packet is sent to a second per-hop behavior queue. These packets are sent in an order that is based on a first service classification associated with the first service first device flow, and a second service classification associated with the second service first device flow. The first service first device flow packet and the second service first device flow packet are sent to a backhaul link in an order that is based on a per-hop behavior associated with the first per-hop behavior queue.

DETAILED DESCRIPTION

Figure 1:
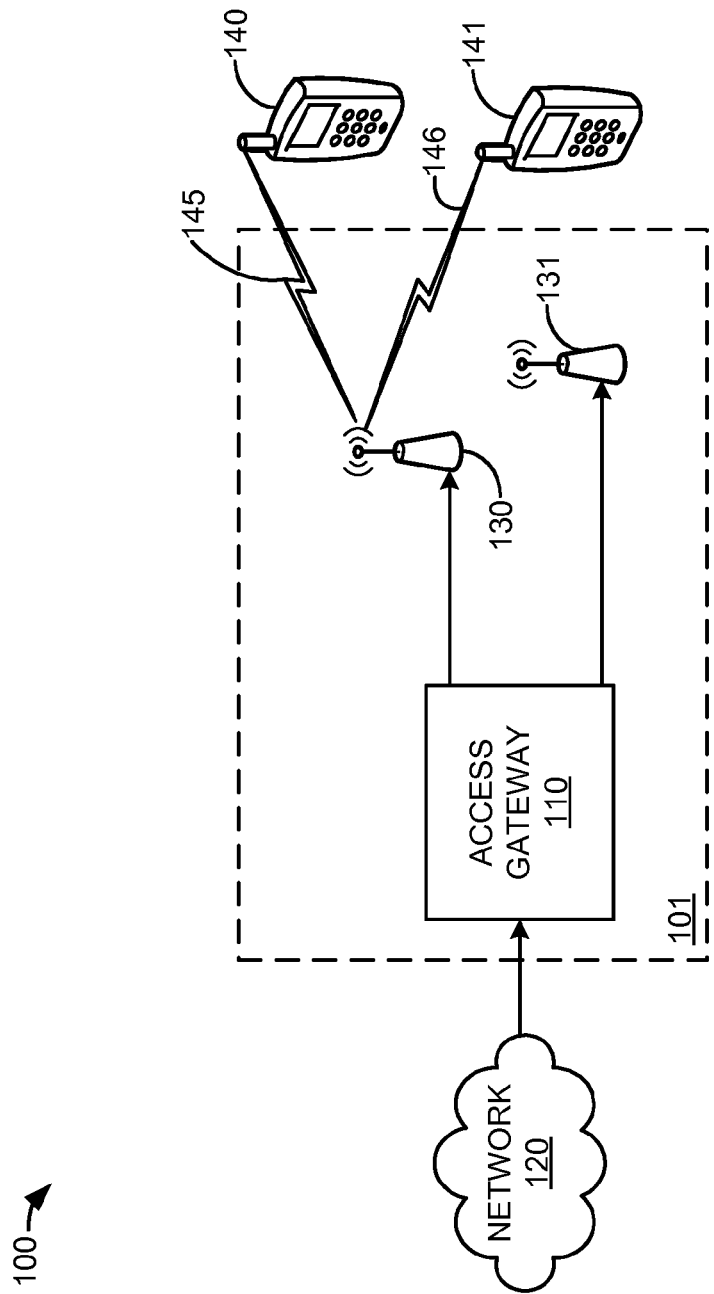
FIG. 1 is a block diagram illustrating a two stage traffic scheduling system.

FIG. 1 is a block diagram illustrating a two stage traffic scheduling system. In FIG. 1, traffic scheduling system 100 comprises: access network 101; access gateway 110; network 120; base station 130; base station 131; wireless device 140; wireless device 141; wireless link 145; and wireless link 146. Access network 101 includes access gateway 110, base station 130, and base station 131.

Network 120 is operatively coupled to access gateway 110. Access gateway 110 is operatively coupled to base station 130 and base station 131 via backhaul links. Base station 130 is operatively coupled to wireless device 140 and wireless device 141 via wireless links 145 and 146, respectively. Thus, network 120 may send traffic to wireless devices 140 and 141 via access network 101, access gateway 110, and base station 130.

Access network 101 may comprise a computer, a network, or a collection of computers and networks that couple, link, or otherwise operatively provide wireless device 140 or wireless device 141 with communication service. It should be understood that access network 101 may comprise secondary data networks. For example, access network 101 may include a backhaul network, a local network, a long distance network, a packet network, or any combination thereof, as well as other types of networks. Access network 101 may be or include one or more of an access service network (ASN), an access service network gateway (ASN-GW), wireless local access network access gateway (WAG), packet data gateway (PDG), mobile switching center (MSC) and packet data serving node (PDSN).

Access network 101 includes base stations 130 and 131. Base station 130 or base station 131 may be any wireless system that provides the air interface to wireless devices 140 and 141 and communication connectivity with access gateway 110. Examples of base station 130 or base station 131 include, base transceiver stations (BTSs), radio base stations (RBSs), Node B, enhanced Node B (eNBs) and others. Base station 130 or base station 131 may include a number of elements known to those skilled in the art comprising a transceiver, power amplifier, combiner, duplexer, antenna and control function.

Wireless device 140 or wireless device 141 may be any device, system, combination of devices, or other such communication platform capable of communicating with access gateway 110 via base station 130. Wireless devices 140 and 141 may be, for example, an a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with access gateway 110 via base station 130. Other types of communication platforms are possible.

Wireless device 140 and wireless device 141 may establish communication sessions with access gateway 110 in order to receive communication services from network 120. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, traffic flows may be directed to wireless device 140 or wireless device 141 from network 120. These traffic flows may have one or more service flow classifications. For example, network 120 may direct a traffic flow to wireless device 140 that includes a service traffic flow classification for voice service and a service traffic flow classification for a web browsing service. Likewise, network 120 may direct a traffic flow to wireless device 141 that includes a service traffic flow classification for voice service and a service traffic flow classification for a web browsing service. The service traffic flow classifications for voice service and for web browsing service may have different quality of service (QoS) requirements. In an embodiment, the traffic flows for these services have different service flow classifications.

In an embodiment, the service flow classifications may include wireless traffic classifications. For example, for WiMAX wireless communication there are wireless traffic quality of service classifications that include: unsolicited grant service (UGS), real time polling service (rtPS), extended real time polling service (ertPS), non-real time polling service (nRTPS), and best effort (BE).

Access gateway 110 may receive the traffic flows directed to wireless device 140 and wireless device 141 from network 120. Access gateway 110 or access network 101 may schedule the traffic flow for each wireless device 140 and 141 based on the service flow classifications. By independently scheduling the traffic flows based on the service flow classifications for wireless device 140 and wireless device 141, access gateway 110 or access network 101 creates two device scheduled flows (e.g., one each for wireless device 140 and wireless device 141.)

In an embodiment, access gateway 110 may separate the traffic directed to wireless device 140 according to the WiMAX QoS classifications. Traffic with different WiMAX QoS classifications may then be placed into different queues. Traffic may then be scheduled from these queues for wireless device 140 using a scheduling algorithm.

Examples of scheduling algorithms that may be used are the "leaky-bucket" algorithm, the "token-bucket" algorithm, a deficit weighted round robin algorithm, and weighted round robin (WRR). The scheduling algorithm may also include an algorithm that determines how to handle queue overflows. Examples of algorithms designed to handle queue overflows (a.k.a. buffer tail drops) include random early detection (RED), weighted RED (WRED), and RED In/Out (RIO).

Access gateway 110 may also separate the traffic directed to wireless device 141 according to the WiMAX QoS classifications. As with wireless device 140, traffic with different WiMAX QoS classifications may then be placed into different queues. The queues for wireless device 141 may be associated with the same service classifications as the queues used for wireless device 140. However, they are different from the queues for wireless device 140. Thus, the traffic flows for wireless device 140 and 141 are scheduled from their respective service flow queues independent of each other. This independent scheduling creates independent device scheduled flows.

Once traffic is independently scheduled based on the service flow classifications for wireless device 140 and wireless device 141, access network 101 or access gateway 110 may classify the device scheduled flows into flow classes that are different from the service flow classifications used previously.

In an embodiment, access network 101 or access gateway 110 classifies the device scheduled flows associated with wireless device 140 and wireless device 141 into flow classes that include one or more of the differentiated services (DiffServ) per-hop behavior classifications. DiffServ per-hop behavior (PHB) classifications are described in RFC-2474, RFC-2475, RFC-2597, and RFC-3246, which are hereby incorporated herein by reference. These documents are available from The Internet Engineering Task Force at http://www.ietf.org/. DiffServ per-hop behavior classifications may be grouped into an expedited forwarding (EF) group, an assured forwarding (AF) group, a class selector group, and a default group.

Once the device scheduled flows are classified into flow classes, access gateway 110 or access network 101 schedules the device scheduled flows that are directed to a base station based on the flow classes. For example, based on the flow classes assigned to the device scheduled flows associated with wireless device 140 and wireless device 141, access gateway 110 or access network 101 may schedule these device scheduled flows to produce an aggregate traffic flow that is sent to base station 130. Thus, the traffic flows directed to wireless devices 140 and 141 are first scheduled according to a service flow classification scheme independent of each other. Then, the resultant device scheduled flows are scheduled according to a flow class scheme. The aggregate traffic flow is then sent to base station 130 for transmission to wireless devices 140 and 141.

Figure 2:
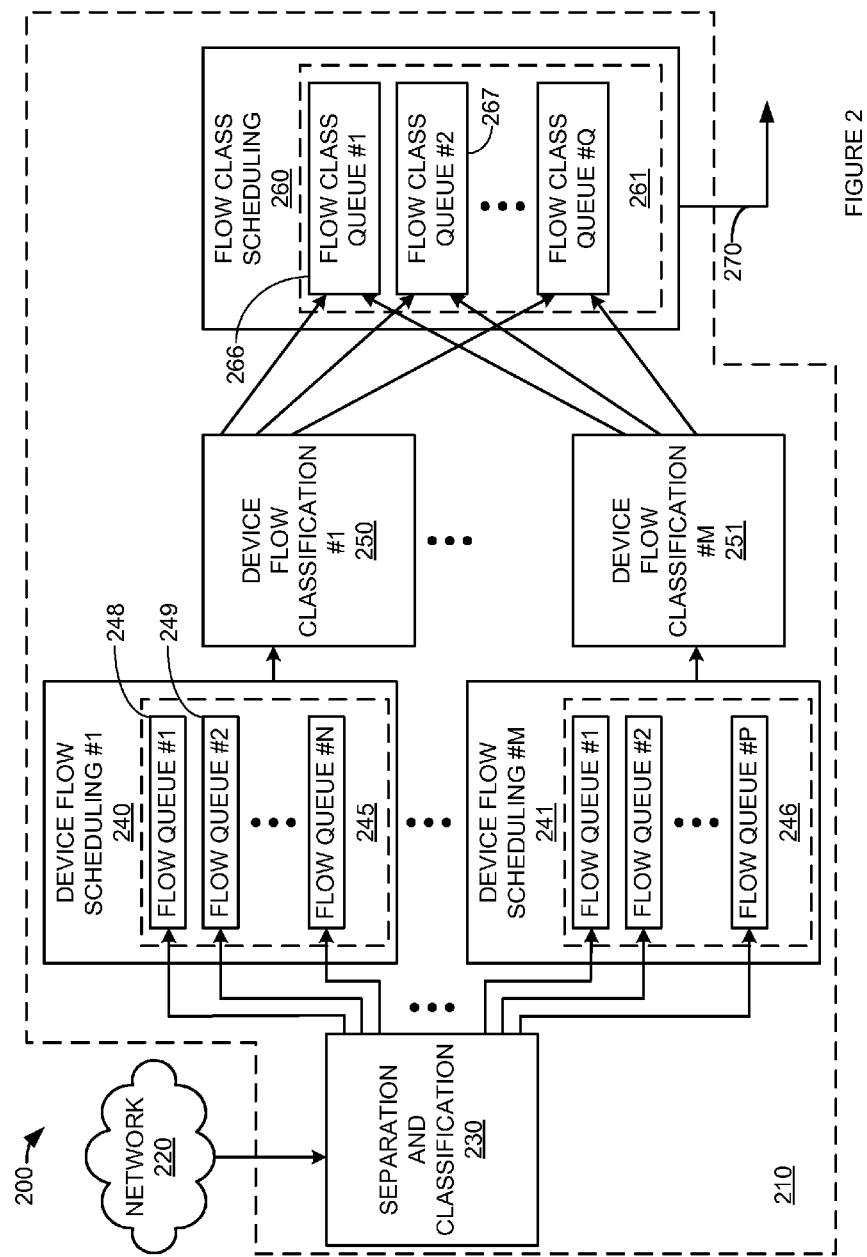
FIG. 2 is a block diagram illustrating a two stage traffic scheduling system.

FIG. 2 is a block diagram illustrating a two stage traffic scheduling system. In FIG. 2, traffic scheduling system 200 comprises: scheduling system 210, network 220, and backhaul link 270. Scheduling system 210 includes separation and classification 230. Scheduling system 210 includes a plurality of device flow scheduling functions 240-241. Device flow scheduling function 240 includes a plurality of flow queues 245 numbered 1 to N. Device flow scheduling function 241 includes a plurality of flow queues 246 numbered 1 to P. Scheduling system 210 includes a plurality of device flow classification functions 250-251. Scheduling system 210 includes a plurality of flow class scheduling 260. Flow class scheduling 260 includes a plurality of flow class queues 261 numbered 1 to Q.

Separation and classification 230 is operatively coupled to network 220. Separation and classification receives traffic from network 220 to be scheduled by scheduling system 210. Separation and classification 230 is operatively coupled to device flow scheduling function 240. In particular, separation and classification 230 is operatively coupled to each of the plurality of flow queues 245. Separation and classification 230 is operatively coupled to device flow scheduling function 241. In particular, separation and classification 230 is operatively coupled to each of the plurality of flow queues 246. Separation and classification 230 separates traffic from network 220 by the device that the traffic is directed to. Accordingly, there is a device flow scheduling function 240-241 for each device receiving traffic from network 220.

Separation and classification 230 also classifies the traffic from network 220 into service classifications. These service classifications may be the wireless service classifications described previously.

Separation and classification 230 sends the traffic from network 220 to the appropriate device flow scheduling function 240-241 and one of the plurality of flow queues 245-246. Thus, for each device and service classification combination, there is a one of the plurality of flow queues 245-246.

Device flow scheduling functions 240 and 241 schedule the traffic out of the plurality of flow queues 245 and 246, respectively. Device flow scheduling functions 240 and 241 may schedule the traffic out of the plurality of flow queues 245 and 246 using a scheduling algorithm described previously.

Device flow scheduling functions 240 and 241 schedule the traffic out of the plurality of flow queues 245 and 246 independent of each other. Device flow scheduling functions 240 and 241 send the traffic they have scheduled to device flow classification 250 and 251, respectively.

Device flow classification 250 and 251 classify the scheduled traffic they receive from device flow scheduling functions 240 and 241, respectively, into flow classes. These flow classes may be the DiffServ classes described previously.

Device flow classification 250 and 251 send the scheduled traffic to the appropriate one of the plurality of flow class queues 261 in flow class scheduling 260. Thus, the scheduled traffic received from device flow traffic classification 250 and 251 by device flow classification 250 and 251 is combined into an appropriate one of the plurality of flow class queues 261 to be scheduled by flow class scheduling 260.

Flow class scheduling 260 schedules the traffic out of the plurality of flow class queues 261. Flow class scheduling 260 schedules the traffic out of the plurality of flow class queues 261 based on the per-hop behavior associated with each of the plurality of flow class queues 261. Flow class scheduling 260 may schedule the traffic out of the plurality of flow class queues 261 using a scheduling algorithm described previously. Flow class scheduling 260 sends the traffic it has scheduled to backhaul link 270.

Figure 3:
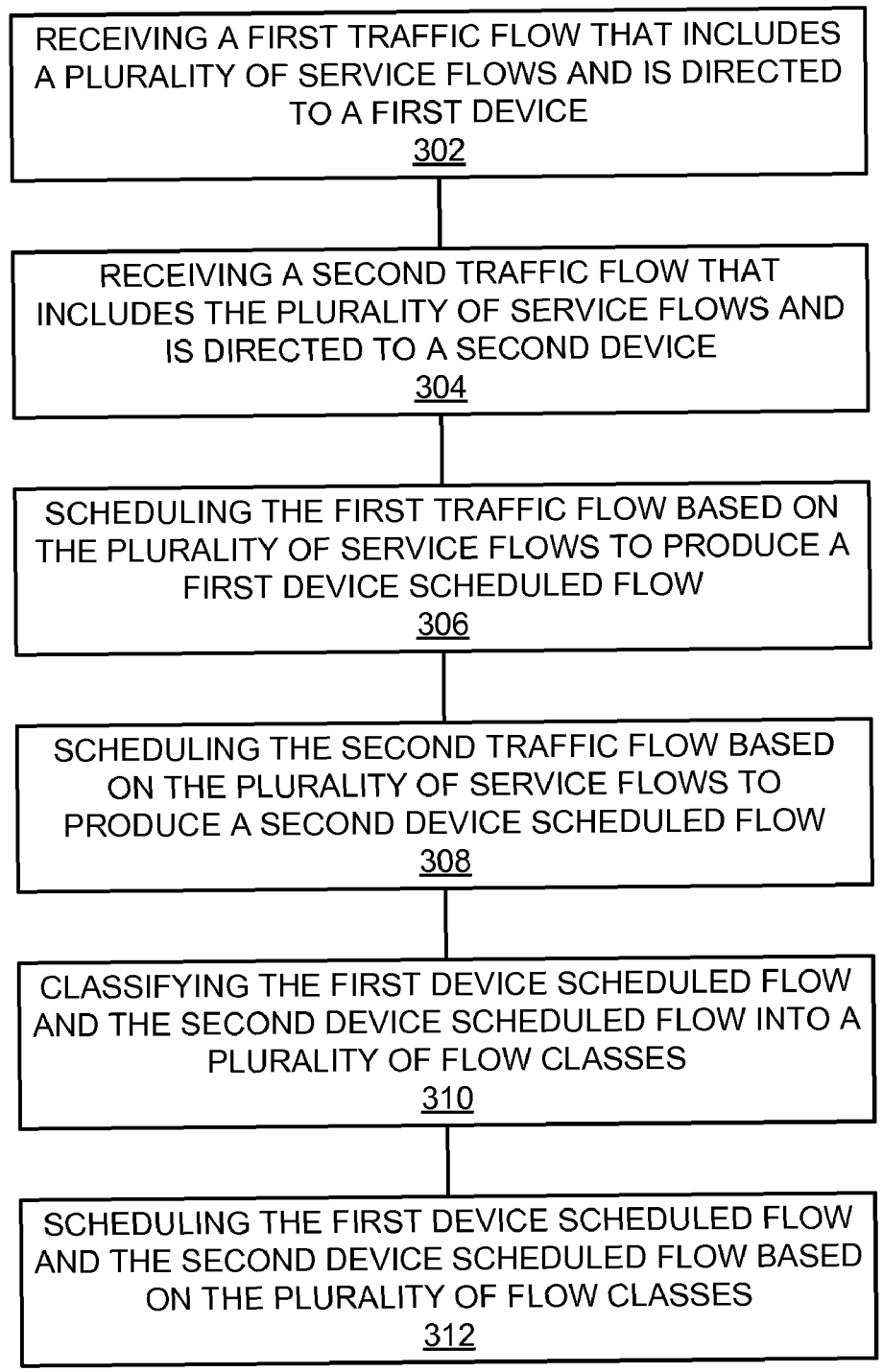
FIG. 3 is a flowchart illustrating a method of managing network traffic.

FIG. 3 is a flowchart illustrating a method of managing network traffic. The steps illustrated in FIG. 3 may be performed by traffic scheduling system 100 or traffic scheduling system 200.

A first traffic flow that includes a plurality of service flows and is directed to a first device is received (302). For example, access network 101 may receive a traffic flow from network 120 that is directed to wireless device 140. This traffic flow may include traffic that may be classified into more than one service flow. For example, the traffic may be classified into service flows that include one or more of: UGS, rtPS, ertPS, nRTPS, and BE, described previously.

A second traffic flow that includes the plurality of service flows and is directed to a second device is received (304). For example, access network 101 may receive a traffic flow from network 120 that is directed to wireless device 141. This traffic flow may include traffic that may be classified into the same service flow classifications as the flows directed to wireless device 140.

The first traffic flow is scheduled based on the plurality of service flows to produce a first device scheduled flow (306). For example, access network 101 may schedule the traffic received from network 120 that is directed to wireless device 140 based on the service flow classification associated with each packet. The resulting flow of scheduled packets can comprise the device scheduled flow for wireless device 140.

The second traffic flow is scheduled based on the plurality of service flows to produce a second device scheduled flow (308). For example, access network 101 may schedule the traffic received from network 120 that is directed to wireless device 141 based on the service flow classification associated with each packet. The resulting flow of scheduled packets can comprise the device scheduled flow for wireless device 141.

The first device scheduled flow and the second device scheduled flow are classified into a plurality of flow classes (310). For example, access network 101 may classify the packets in the device scheduled flow for wireless devices 140 and 141 into DiffServ per-hop behavior classes described previously.

The first device scheduled flow and the second device scheduled flow are scheduled based on the plurality of flow classes (312). For example, access network 101 may schedule the packets in the device scheduled flows for wireless devices 140 and 141 based upon their associated DiffServ per-hop behavior classes. The scheduled packets from the aggregation of the device scheduled flows for wireless devices 140 and 141 may then be sent to base station 130 via a backhaul link.

Figure 4:
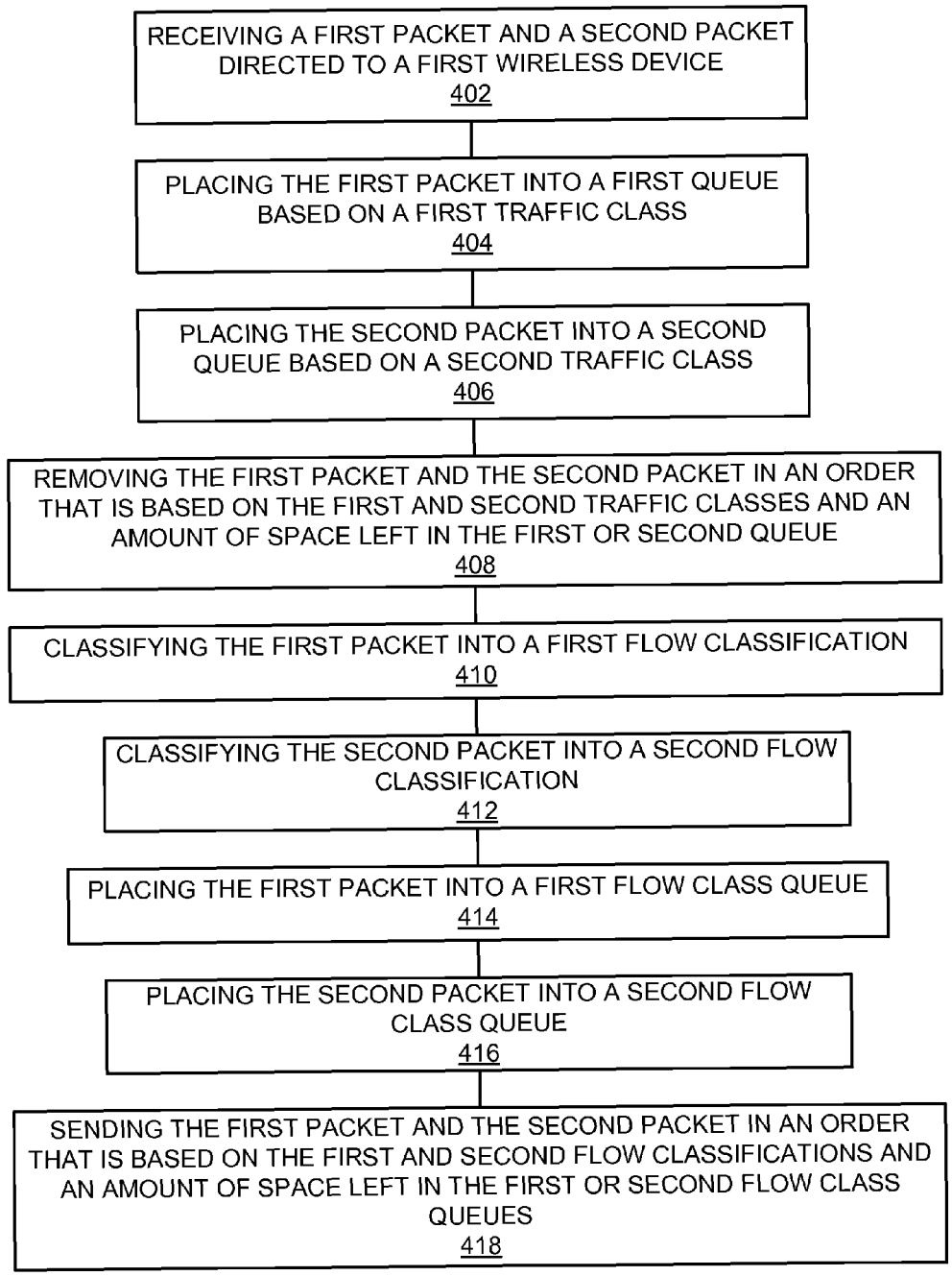
FIG. 4 is a flowchart illustrating a method of scheduling backhaul traffic to a plurality of wireless devices.

FIG. 4 is a flowchart illustrating a method of scheduling backhaul traffic to a plurality of wireless devices. The steps illustrated in FIG. 4 may be performed by traffic scheduling system 100 or traffic scheduling system 200.

A first packet and a second packet that are directed to a first wireless device are received (402). For example, access network 101 may receive packets from network 120 that are directed to wireless device 140. In another example, scheduling system 210 may receive packets from network 220.

The first packet is placed into a first queue based on a first traffic class (404). For example, separation and classification 230 may place a packet into one of the plurality of flow queues 245 based on both the device that the packet is directed to and the traffic class associated with that packet. In another example, separation and classification 230 may place the first packet into flow queue 248 based on both the device that the first packet is directed to and the traffic class associated with the first packet. In an embodiment, the first packet may be placed into flow queue 248 based on an associated classification that includes one or more of: UGS, rtPS, ertPS, nRTPS, and BE, described previously.

The second packet is placed into a second queue based on a second traffic class (406). For example, separation and classification 230 may place a packet into one of the plurality of flow queues 245 based the traffic class associated with that packet. In an embodiment, the second packet may be placed into the second queue that is associated with a different traffic classification than the traffic classification associated with the first queue. In another example, separation and classification 230 may place the second packet into flow queue 249 based on both the device that the second packet is directed to and the traffic class associated with the second packet. In an embodiment, the second packet may be placed into flow queue 249 based on an associated classification that includes one or more of: UGS, rtPS, ertPS, nRTPS, and BE, described previously.

The first packet and the second packet are removed from the first queue and the second queue, respectively, in an order that is based on the first and second traffic classes and an amount of space left in the first or second queue (408). For example, a packet may be removed by device flow scheduling function 240 from flow queue #1 248 before another packet is removed from flow queue #2 249 based on the traffic classes associated with flow queue 248 and flow queue 249 and an amount of space left in flow queue 248.

The first packet is classified into a first flow classification (410). For example, a packet that was sent to device flow classification 250 by device flow scheduling 240 may be classified by device flow classification 250 into a flow classification. In an embodiment, this first flow classification is at least one of the DiffServ per-hop behavior classes described previously.

The second packet is classified into a second flow classification (412). For example, a packet that was sent to device flow classification 250 by device flow scheduling 240 may be classified by device flow classification 250 into a flow classification. In an embodiment, this second flow classification is at least one of the DiffServ per-hop behavior classes described previously.

The first packet is placed into a first flow class queue (414). For example, device flow classification 250 may place the first packet into flow class queue 266 because flow class queue 266 is associated with the first flow classification.

The second packet is placed into a second flow class queue (416). For example, device flow classification 250 may place the second packet into flow class queue 267 because flow class queue 267 is associated with the second flow classification.

The first packet and the second packet are sent in an order that is based on the first and second flow classifications and an amount of space left in the first or second flow class queues (418). For example, flow class scheduling 260 may send the first packet and the second packet to backhaul link 270 in an order that is based on the first and second flow classification and an amount of space left in flow class queue 266 or flow class queue 267. Flow class scheduling 260 may send the first and second packets in an order that is determined by a scheduling algorithm such as the scheduling algorithms disclosed previously.

Figure 5:
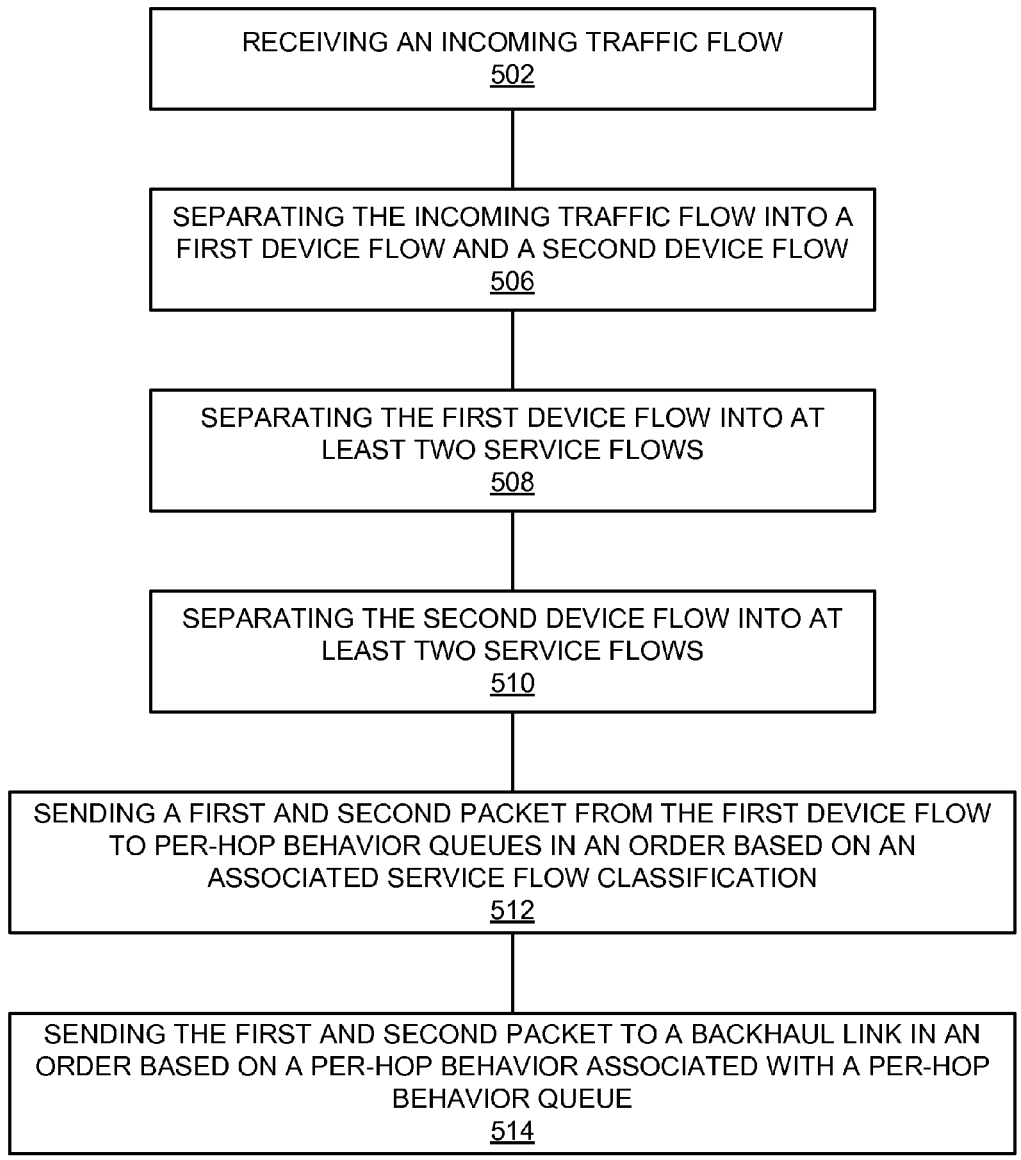
FIG. 5 is a flowchart illustrating a method of scheduling backhaul traffic directed to a plurality of wireless devices.

FIG. 5 is a flowchart illustrating a method of scheduling backhaul traffic directed to a plurality of wireless devices. The steps illustrated in FIG. 5 may be performed by traffic scheduling system 100 or traffic scheduling system 200.

An incoming traffic flow is received (502). For example, access network 101 may receive a traffic flow from network 120. The incoming traffic flow is separated into a first device flow and a second device flow (506). For example, access network 101 may separate the incoming traffic flow into a flow directed to wireless device 140 and a flow directed to wireless device 141.

The first device flow is separated into at least two service flows (508). For example, access network may separate the flow directed to wireless device 140 into two or more service flow classifications. In an embodiment, the at least two service flows may include one or more of: UGS, rtPS, ertPS, nRTPS, and BE, described previously.

The second device flow is separated into at least two service flows (510). For example, access network may separate the flow directed to wireless device 141 into two or more service flow classifications. In an embodiment, the at least two service flows may include one or more of: UGS, rtPS, ertPS, nRTPS, and BE, described previously.

A first packet and a second packet from the first device flow are sent to per-hop behavior queues in an order based on an associated service flow classification (512). For example, access network 101 may send a first packet before a second packet to a per-hop behavior queue because the first packet came from a service flow that has a higher priority than the service flow the second packet came from.

The first packet and the second packet are sent to a backhaul link in an order that is based on a per-hop behavior associated with a per-hop behavior queue (514). For example, access network 101 may send a first packet before a second packet to base station 130 via a backhaul link because the first packet came from a per-hop behavior queue that has a higher priority than the per-hop behavior queue that the second packet came from. In an embodiment, the first and second packets may be sent in an order that is determined by a scheduling algorithm such as the scheduling algorithms disclosed previously.

The methods, systems, devices, queues, links, networks, and base stations described above may be implemented with, contain, or be executed by one or more computer systems. The methods described above may also be stored on a computer readable medium. Many of the elements of traffic scheduling system 100 and traffic scheduling system 200 may be, comprise, or include computers systems. This includes, but is not limited to: access network 101; access gateway 110; network 120; base station 130; base station 131; wireless device 140; wireless device 141; access gateway 110, base station 130, base station 131; scheduling system 210; network 220; and, backhaul link 270.

Figure 6:
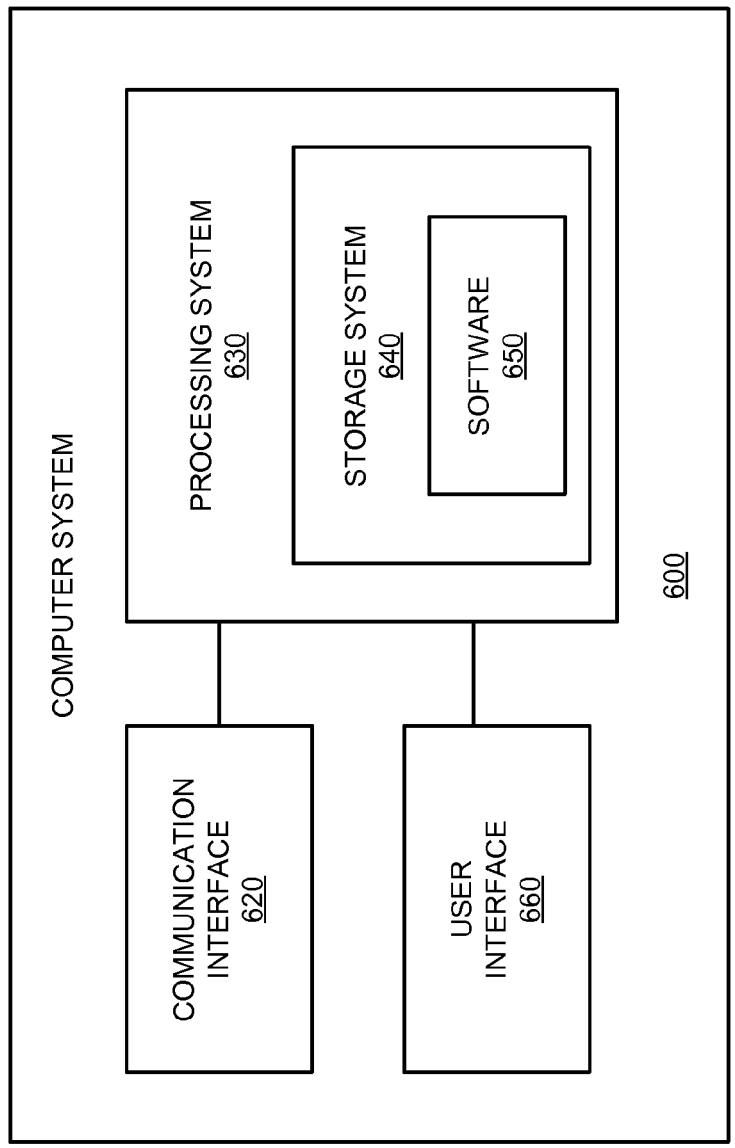
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling backhaul traffic directed to a plurality of wireless devices, comprising:
   receiving an incoming traffic flow comprising a first device flow and a second device flow;
   separating the incoming traffic flow into the first device flow and the second device flow;
   separating at a first scheduler the first device flow into a first service first device flow comprising at least one first service first device flow packet and a second service first device flow comprising at least one second service first device flow packet;
   separating at a second scheduler the second device flow into a first service second device flow comprising at least one first service second device flow packet and a second service second device flow comprising at least one second service second device flow packet;
   sending a first service first device flow packet to a first per-hop behavior queue and a second service first device flow packet to a second per-hop behavior queue in an order based on a first service classification associated with the first service first device flow and a second service classification associated with the second service first device flow;
   sending a first service second device flow packet to the first per-hop behavior queue and a second service second device flow packet to the second per-hop behavior queue in an order based on the first service classification associated with the first service second device flow and the second service classification associated with the second service second device flow; and,
   sending the first service first device flow packet and the first service second device flow packet from the first per-hop behavior queue, and the second service first device flow packet and the second service second device flow packet from the second per-hop behavior queue to a backhaul link in an order based on a first per-hop behavior associated with the first per-hop behavior queue and a second per-hop behavior associated with the second per-hop behavior queue.

2. The method of claim 1, wherein the first service first device flow, the second service first device flow, the first service second device flow, and the second service second device flow are mapped to wireless traffic classifications.

3. The method of claim 2, wherein the wireless traffic classifications comprise at least two WiMAX traffic classes.

4. The method of claim 3, wherein the WiMAX traffic classes include two or more of unsolicited grant service (UGS), extended real time polling server (ertPS), real time polling service (rtPS), non-real time polling service (nRTPS), and best effort (BE).

5. The method of claim 1, wherein the first service classification and the second service classification include at least one DiffServ per-hop behavior classes.

6. The method of claim 5, wherein the DiffServ per-hop behavior classes includes a per-hop behavior class selected from at least one of: an expedited forwarding per-hop behavior group, an assured forwarding group, a default group, and a class selector group.

* * * * *